(12) United States Patent
Cort

(10) Patent No.: US 7,691,269 B2
(45) Date of Patent: Apr. 6, 2010

(54) METHOD AND SYSTEM FOR RETROFITTING AN EXISTING WATER TREATMENT SYSTEM

(76) Inventor: Steven L. Cort, 411 Bathgate La., Cary, NC (US) 27513

( * ) Notice: Subject to any disclaimer, the term of this patent is extended or adjusted under 35 U.S.C. 154(b) by 0 days.

(21) Appl. No.: 11/862,490

(22) Filed: Sep. 27, 2007

(65) Prior Publication Data

US 2008/0073267 A1    Mar. 27, 2008

Related U.S. Application Data

(60) Provisional application No. 60/847,373, filed on Sep. 27, 2006.

(51) Int. Cl.
*C02F 3/02* (2006.01)
*C02F 1/48* (2006.01)

(52) U.S. Cl. .................. 210/620; 210/617; 210/631; 210/695; 210/714; 210/223; 210/253

(58) Field of Classification Search .............. 210/605
See application file for complete search history.

(56) References Cited

U.S. PATENT DOCUMENTS

| | | | | |
|---|---|---|---|---|
| 3,697,420 A | * | 10/1972 | Blaisdell et al. | 210/695 |
| 4,502,958 A | * | 3/1985 | Sasaki | 210/695 |
| 4,735,725 A | * | 4/1988 | Reischl et al. | 210/616 |
| 4,981,593 A | * | 1/1991 | Priestley et al. | 210/613 |
| 6,099,738 A | * | 8/2000 | Wechsler et al. | 210/695 |
| 6,896,815 B2 | * | 5/2005 | Cort | 210/695 |
| 7,001,519 B2 | | 2/2006 | Linden et al. | |
| 7,255,793 B2 | | 8/2007 | Cort | |
| 2003/0082084 A1 | * | 5/2003 | Cort | 423/25 |

* cited by examiner

*Primary Examiner*—Peter A Hruskoci
(74) *Attorney, Agent, or Firm*—Michael de Angeli

(57) ABSTRACT

A method and system for retrofitting an existing water treatment system having one or more biological reactor systems and one or more gravity clarifiers. To retrofit the existing water treatment system, the one or more gravity clarifiers of the existing water treatment system are converted to one or more biological reactors. In addition, one or more high rate clarifiers (HRCs) are added to the existing water treatment system. In some cases one or more high rate clarifiers are added downstream of the converted biological reactors, in other cases one or more HRCs is added upstream of the biological reactors, and in other cases a number of HRCs are added, upstream and downstream with respect to the biological reactors.

12 Claims, 2 Drawing Sheets

METHOD AND SYSTEM FOR RETROFITTING AN EXISTING WATER TREATMENT SYSTEM

CROSS-REFERENCE TO RELATED APPLICATION

This application claims benefit of priority under 35 U.S.C. §119(e) from the following U.S. provisional application: Ser. No. 60/847,373 filed on Sep. 27, 2006. That application is incorporated in its entirety by reference herein.

FIELD OF THE INVENTION

The present invention relates to water treatment systems and processes and more particularly to a method and apparatus for retrofitting existing biological water treatment systems to increase the efficiency and effectiveness of such systems.

BACKGROUND OF THE INVENTION

Water has been commercially cleaned by magnetic seeding and separation technologies for many years.

A known commercial use of magnetic treatment technologies is the "Sirofloc" technology used in Australia to clean drinking water. This process uses the absorption capacity of magnetite to remove color and other pollutants from water. The spent magnetic seed material (magnetite) settles out by gravity in a clarifier and then is pumped to a cleaning step so the magnetite can be reused. Present efforts are to use this technology to clean municipal wastewater.

Another known commercial application of magnetic treatment is the "Comag" process described in Wechsler U.S. Pat. No. 6,099,738, which is designed to remove phosphate from municipal wastewater. This process has a high gradient field magnetic collector that uses powerful electromagnets. Once the collector becomes loaded with solids, it is backwashed with air and water to flush the magnetic seed material to a cleaning process. The cleaned magnetic seed material is then reused in the treatment process. The electromagnets in the Comag system have to be de-energized for cleaning. The cleaning process interrupts the flow of water for treatment and high solids loading limits the ability to backwash the system.

The present invention relates to the use of magnetic seeding and separation technologies to correct water treatment problems found at municipal water treatment facilities, specifically wastewater.

SUMMARY OF THE INVENTION

A method of retrofitting an existing biological wastewater treatment system is disclosed. The existing wastewater treatment system includes one or more biological reactors and one or more gravity clarifiers. The method includes converting the one or more gravity clarifiers of the existing water treatment system to one or more biological reactors. In addition, a high rate clarifier is added to the existing water treatment system.

In one embodiment, the existing water treatment system is provided with one or more additional high rate clarifiers. The additional one or more high rate clarifiers can be incorporated into the converted biological reactors or disposed downstream from the biological reactors.

Further, a water treatment system is disclosed that includes one or more biological reactors for biologically treating water. The system further includes at least one high rate clarifier disposed upstream from the one or more biological reactors. One or more other high rate clarifiers are used for clarifying the effluent of the one or more biological reactors.

Other objects and advantages of the present invention will become apparent and obvious from a study of the following description and the accompanying drawings which are merely illustrative of such invention.

DETAILED DESCRIPTION OF THE INVENTION

Figure 1:
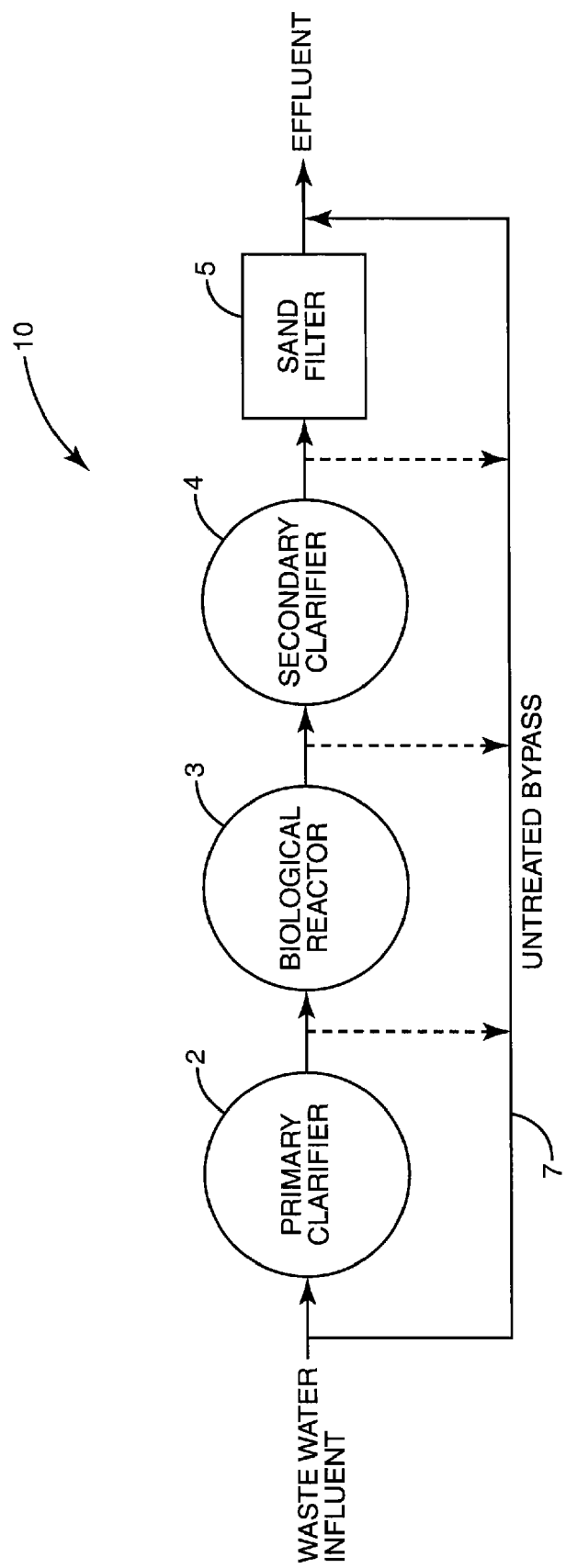
FIG. 1 is a schematic illustration of an existing wastewater treatment system.

Aging municipal wastewater treatment plants have difficulty meeting flow requirements and removing necessary pollutants to meet discharge limits. Often the problem is either inefficient clarification or undersized biological treatment. Until now, a common solution to these problems was to shut down the plant and build a new plant elsewhere because there is usually not enough space to correct these problems. Finding a suitable new site is difficult and costly. Distribution systems would have to be rerouted to a new site at great cost.

Disclosed herein is a method for addressing both of these problems by adding one or more high rate clarifiers (HRC) and converting existing gravity clarifiers to biological treatment systems to treat water. The term "water" as used herein includes water and all forms of wastewater. A "high rate clarifier" is defined as a clarifier that has a surface overflow rate greater than five gallons per minute per square foot of surface area. A HRC may have a Surface Overflow Rate (SOR) of about 50 gallons per minute per square foot of surface area (GPMSF) which is approximately 100 times greater than a conventional clarifier. This conversion can be made with any HRC technology such as a magnetic treatment system, possibly combined with vortex separation as disclosed in U.S. patent application Ser. No. 11/503,951 and entitled "Water Treatment Using Magnetic and Other Field Separation Technologies." According to the present invention, biological treatment such as Moving Bed Biological Reactor (MBBR) is added to increase the efficiency of the more standard activated sludge biological treatment system. Having no Returned Activated Sludge (RAS) will reduce the solid loading on the high rate clarifiers. This approach may provide significant savings in cost and space.

Thus, HRC technology is employed to convert gravity clarifiers to a biological treatment process. In one embodiment, the HRC technology is based on magnetic seeding and separation technologies.

Even though biological treatment is usually not a part of drinking water treatment per se, the concept of increasing treatment capacity without increasing the footprint size by installing a HRC within a gravity clarifier also applies. In the case of drinking water treatment, clarification is the primary treatment method. The clarifiers used are traditional clarifiers that rely upon gravity settling to clarify the water. The SOR for this type of clarifier is about 0.5 GPMSF. Therefore, to clean 10,000 gallons per minute, the size of the clarifier would have to be about 20,000 square feet. Accordingly the present HRCs can be mounted inside the old gravity clarifiers. As noted here before, a HRC may have an SOR of about 50 GMPSF and would thus be required to be no more one one-hundredth the size of a conventional clarifier for the same flow. Said another way, a HRC clarifier of the same size (area) of a conventional clarifier would have 100 times the flow capacity of a conventional clarifier. HRCs according to the present invention include magnetic seeding and separation technology to remove pollutants and clarify water. The magnetic seeding and subsequent separation techniques disclosed in application Ser. No. 11/503,951 (the '951 application) and U.S. Pat. No. 7,255,793 are useful to remove many particulate pollutants, not merely heavy metals and the like. The disclosures of the '951 application and U.S. Pat. No. 7,255,793 are expressly incorporated herein by reference. A large number of HRCs could be contained inside a conventional clarifier and therefore greatly increase the treatment capacity without increasing the footprint of the treatment process.

Municipal wastewater treatment systems in this country are aging, and are often under capacity and not capable of meeting water quality discharge limits. This application discloses the use of high rate clarification, preferably using magnetic separation technology, to address the limitations of existing municipal wastewater systems.

Existing municipal wastewater treatment systems typically contain primary clarification, biological treatment, secondary clarification, and sometimes sand filtration. The primary and secondary clarifiers rely on gravity alone to perform separation, and are extremely inefficient compared to the new generation of high rate clarifiers disclosed herein. The SOR of conventional clarifiers can be below one $gpm/ft^2$ and often as low as 0.1 $gpm/ft^2$. Assuming an average SOR of 0.5 $gpm/ft^2$, the total surface area for the primary and secondary clarifiers for a flow rate of 10,000 gpm will be 40,000 square feet. Under these conditions, each circular structure would be 160 feet in diameter. A typical magnetic separator as disclosed herein would have a footprint of about 144 square feet or about 140 times smaller than a conventional clarifier.

According to one aspect of the present invention, existing clarifiers can be converted into biological treatment tanks. Clarifiers are often similar in size and shape to biological treatment tanks and are designed with sludge removing equipment. Basically, clarifiers are only lacking aeration equipment. Then the converted clarifiers would be replaced with more efficient HRC systems, such as those employing magnetic separation systems. This approach will increase the capacity of the plant, both hydraulically and biologically, to better clean a greater volume of water. Additional HRCs can be added to treat wet weather flows. These additional HRCs when not in use becomes spares to increase plant reliability.

Figure 2:
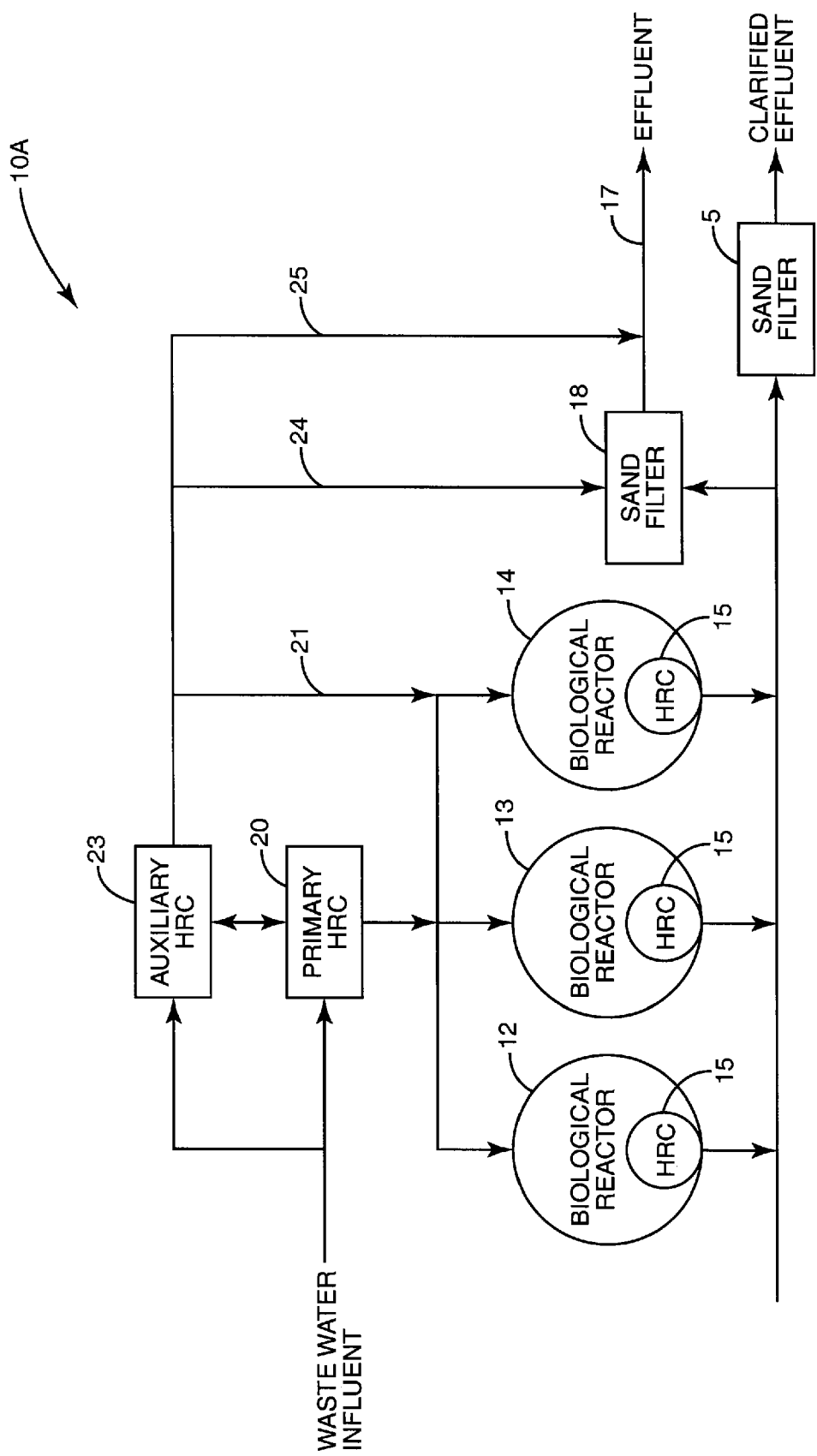
FIG. 2 is a schematic illustration showing a retrofit for an existing wastewater treatment system.

FIG. 1 shows schematically the components of a traditional municipal wastewater treatment system with clarification and biological treatment. FIG. 2 shows a modified water treatment system where conventional gravity clarifiers have been converted to biological reactors and where a number of HRCs have been added. "HRCs" are defined as clarifiers that have a surface overflow rate greater than five gallons per minute per square foot of surface area.

In the conventional system 10 of FIG. 1, wastewater influent entering first flows through a primary clarifier 2 to separate out large solids by gravity. Flow then proceeds to a biological treatment tank 3. In many cases the biological treatment tank 3 is utilized for aerobic treatment. However, biological treatment can also entail anaerobic and/or anoxic treatment as used, for example, in nitrification and denitrification. The biologically treated wastewater then flows to a secondary clarifier 4 to remove most of the suspended solids, followed by sand filtration 5 for final removal of most turbidity, and is then discharged. During wet weather conditions, when flow exceeds the capacity of the treatment facility, untreated water can be bypassed at several possible stages through pipe 7 as indicated by the broken lines in FIG. 1.

FIG. 2 illustrates a retrofitted wastewater treatment plant or system 10A in which certain components of the prior system 10 have been modified and new components have been added. The prior existing gravity clarifiers 2, 4 shown in FIG. 1 have been converted to biological reactors 12, 14 and a number of HRC units have been added. Converting the gravity clarifiers 2, 4 of prior plant 10 to biological treatment systems will typically involve the addition of aeration equipment if an aerobic system is desired. In some cases, it is appreciated that the biological reactors 12, 13 and 14 in retrofitted plant 10A could be operated as anaerobic or anoxic reactors. In one embodiment, the biological system would be a Moving Bed Biological Reactor (MBBR). In this case, a plastic media is added for the growth of fixed biofilms. The particulars of the conversion will vary depending upon the type of biological treatment desired. It is contemplated that a wide range of biological treatments is performed in the biological reactors. For example, various mixes of aerobic, anaerobic, and anoxic treatments can be employed to accomplish BOD removal, nitrification-denitrification, phosphorus removal, etc. Retrofitted plant 10A includes a primary HRC unit 20, possibly employing vortex separators with magnetic seeding according to the teachings of U.S. patent application Ser. No. 11/503,951 to serve as a primary clarifier for the retrofitted system. An auxiliary HRC 23 is incorporated to provide for high flow conditions. Converted biological reactors 12, 14 along with the original biological reactor 3 are configured to operate in parallel as illustrated in FIG. 2. Secondary High Rate Clarification units 15 may be located inside the biological reactors 12, 13 and 14 to conserve space, or downstream from the biological reactors of retrofitted system 10A.

In operation of retrofitted system 10A of FIG. 2, raw sewage or wastewater influent enters the primary HRC 20 for removing large suspended solids. If phosphate removal is needed, iron or aluminum reagents can be added at this point to precipitate phosphate as a metal salt, which will be removed with the primary sludge. Following clarification in the primary HRC 20, flow passes to the biological treatment tanks 12, 13, 14 disposed in parallel relationship. From the biological reactors 12, 3 and 14, the wastewater being treated is directed to secondary HRCs 15 where the mixed liquor suspended solids (MLSS) are removed. In one embodiment, one of the HRCs 15 is located inside each respective biological treatment tank 12, 13, 14 to save on footprint as noted here before, and to simplify the return of sludge to the system. Alternatively, the HRCs 15 can be placed downstream from the biological reactors 12, 13, and 14 of retrofitted system 10A.

In HRCs 15, iron or aluminum reagents can be added to polish out residual amounts of phosphate not removed in the primary clarification and biological treatment stages. Clarified water then flows from the HRC units 15 to the existing sand filter 5. An additional sand filter 18 may be necessary to handle the increased flow through the system. The clean effluent is significantly increased and with better water quality.

In the event of a wet weather event, a spare HRC 23 is available to treat excess flows that can be routed through pipeline 21 for additional biological treatment, or routed through pipeline 24 for additional sand filtration, or routed through pipeline 25 for direct discharge through pipeline 17. During normal operation, spare HRC 23 provides backup reliability to the primary HRC 20.

As seen in FIG. 2, the retrofitted water treatment system includes a series of biological reactors 12, 13 and 14. These biological reactors are disposed in parallel relationship. When these three biological reactors 12, 3 and 14 are utilized in parallel, it is appreciated that the capacity of the wastewater treatment system is substantially increased compared to the preexisting water treatment system 10 shown in FIG. 1 that operates in series.

In disclosing and describing the methods and systems for treating water, magnetic seeding and magnetic separation have been disclosed as a means of clarifying and removing solids from the water. Generally, magnetic seeding and separation entails mixing magnetic seed, such as magnetite, with the water being treated. Through flocculation, adsorption, absorption and other physical or chemical means, contaminants such as suspended solids, scalants, heavy metals, etc. attach to the magnetic seed to form magnetic particles or magnetic floc. In the case of flocculation, a coagulant and a flocculent may be mixed with the water. Typically, the process of magnetic separation entails utilizing a magnetic collector such as a rotary magnetic drum or a series of rotary magnetic disks or any device that creates a magnetic field strong enough to remove ferromagnetic particles from water. Such collectors are at least partially submerged in the water being treated and are normally driven such that portions of the collectors move through the water. In the process, magnetic particles or magnetic floc are collected by the magnetic collector. These magnetic particles or magnetic floc are removed from the magnetic collector and directed to a shear chamber. In the shear chamber, the magnetic particles or magnetic floc are sheared, separating the magnetic seed and effectively producing magnetic seed and sludge. The same magnetic collector, or a second magnetic collector, can be utilized to collect the separated magnetic seed. After the magnetic seed has been collected by the magnetic collector, the seed is removed from the magnetic collector and returned to the same treatment tank or chamber, or otherwise recycled. The separated sludge is collected and directed from the system or process.

Reference is made to the magnetic seeding and subsequent separation techniques disclosed in application Ser. No. 11/503,951 (the '951 application) and U.S. Pat. No. 7,255, 793. The disclosures of the '951 application and U.S. Pat. No. 7,255,793 are expressly incorporated herein by reference.

The present invention may, of course, be carried out in other specific ways than those herein set forth without departing from the scope and the characteristics of the invention. The present embodiments are therefore to be construed in all aspects as illustrative and not restrictive and all changes coming within the meaning and equivalency range of the appended claims are intended to be embraced therein.

The invention claimed is:

1. A method of retrofitting an existing water treatment system having one or more biological reactors and one or more gravity clarifiers, comprising: converting the one or more gravity clarifiers of the existing water treatment system to one or more biological reactors; and adding a high rate clarifier having a surface overflow rate of at least five gallons per minute per square foot of surface area to the existing water treatment system downstream of the converted biological reactor, wherein the high rate clarifier includes a magnetic separator for forming magnetic floc by mixing magnetic seed with water to be treated and including a rotary magnetic collector for removing the magnetic floc from the water contained in the high rate clarifier.

2. The method of claim 1 including placing another high rate clarifier in one or more of the converted biological reactors.

3. The method of claim 1 wherein the existing water treatment system includes at least two gravity clarifiers, and the method includes converting the two gravity clarifiers to two biological reactors.

4. The method of claim 3 wherein the existing water treatment system includes at least one biological reactor that remains a biological reactor in the retrofitted water treatment system, resulting in a retrofitted water treatment system including at least three biological reactors.

5. The method of claim 1 including placing a high rate clarifier upstream from the one or more converted biological reactors.

6. The method of claim 1 wherein the existing water treatment system includes a primary gravity clarifier and a secondary gravity clarifier and wherein the method includes converting both the primary and secondary gravity clarifiers to two separate biological reactors; and placing the high rate clarifier downstream from the two converted biological reactors.

7. The method of claim 1 including providing one or more of the gravity clarifiers of the existing water treatment system with aeration equipment.

8. The method of claim 1 wherein adding a high rate clarifier to the existing water treatment system includes adding at least one high rate clarifier upstream of the converted biological reactors and at least one high rate clarifier downstream of the converted biological reactors.

9. The method of claim 8 wherein the one or more high rate clarifiers downstream of the one or more biological reactors is disposed in one of the biological reactor.

10. The method of claim 8 including placing a magnetic cleaning system in one or more of the high rate clarifiers including placing one or more magnetic collectors for collecting magnetic floc in the high rate clarifier and employing a shear chamber for receiving magnetic floc from the magnetic collector for shearing the magnetic floc and producing magnetic seed and sludge.

11. The method of claim 1 wherein the existing water treatment system includes at least one biological reactor in series with one or more gravity clarifiers, and the method includes converting at least one gravity clarifier of the existing water treatment system to a biological reactor in a retrofitted system; and wherein the retrofitted system includes a plurality of biological reactors including at least one converted biological reactor; and the method includes placing two or more of the biological reactors in the retrofitted system in parallel relationship.

12. The method of claim 11 wherein the existing water treatment system includes two gravity clarifiers and at least one biological reactor in series, and wherein the method includes converting the two gravity clarifiers of the existing water treatment system to two biological reactors and placing the two converted biological reactors in parallel relationship in the retrofitted system.

* * * * *